(12) United States Patent
Floss et al.

(10) Patent No.: US 10,218,887 B2
(45) Date of Patent: Feb. 26, 2019

(54) PHOTOGRAPHY SYSTEM

(71) Applicant: CHRONEXT Service Germany GmbH, Cologne (DE)

(72) Inventors: Sebastian Floss, Cologne (DE); Malte Maximilian Maesgen, Cologne (DE); Marcel Kamps, Cologne (DE); Ludwig Wurlitzer, Neustadt (DE)

(73) Assignee: Chronext Service Germany GmbH, Cologne (DE)

( * ) Notice: Subject to any disclaimer, the term of this patent is extended or adjusted under 35 U.S.C. 154(b) by 15 days.

(21) Appl. No.: 15/236,836

(22) Filed: Aug. 15, 2016

(65) Prior Publication Data

US 2017/0048434 A1    Feb. 16, 2017

(30) Foreign Application Priority Data

Aug. 13, 2015  (EP) .................................... 15180918

(51) Int. Cl.
| | |
|---|---|
| *H04N 7/18* | (2006.01) |
| *H04N 5/225* | (2006.01) |
| *H04N 5/232* | (2006.01) |
| *H04N 5/262* | (2006.01) |
| *G04D 1/00* | (2006.01) |

(52) U.S. Cl.
CPC ............ *H04N 5/2256* (2013.01); *G04D 1/00* (2013.01); *H04N 5/23229* (2013.01); *H04N 5/23293* (2013.01); *H04N 5/262* (2013.01); *H04N 7/183* (2013.01)

(58) Field of Classification Search
CPC .................................................... H04N 5/2256
See application file for complete search history.

(56) References Cited

U.S. PATENT DOCUMENTS

| | | | | |
|---|---|---|---|---|
| 4,710,259 | A * | 12/1987 | Howe .................. | G01N 23/207 117/15 |
| 5,383,552 | A * | 1/1995 | Dikowitz ............... | A45C 11/10 206/301 |
| 5,810,162 | A * | 9/1998 | Au ......................... | A45C 11/16 16/334 |
| 5,811,817 | A * | 9/1998 | Ravich ................... | G01N 21/87 250/372 |
| 5,865,306 | A * | 2/1999 | Ovadia .................... | A47F 7/02 206/566 |
| 6,017,127 | A * | 1/2000 | Kurple .................. | G01D 11/28 362/23.01 |

(Continued)

FOREIGN PATENT DOCUMENTS

| | | |
|---|---|---|
| DE | 197 09 050 A1 | 1/1998 |
| DE | 10 2005 016 233 B4 | 2/2008 |

(Continued)

OTHER PUBLICATIONS

Montredo: "Spinning watches: IWC Fliegeruhr Doppel chronograph IW377801", Feb. 11, 2015 (Feb. 11, 2015), p. 1, XP054976346, Retrieved from Internet: URL:https://www.youtube.com/watch?v=gP7cmPLpKOg [retrieved on Feb. 2, 2016].

*Primary Examiner* — Jayanti K Patel
*Assistant Examiner* — Irfan Habib
(74) *Attorney, Agent, or Firm* — Norris McLaughlin, P.A.

(57) ABSTRACT

The invention relates to a photography system and to a method of generating a multi-view picture of a wristwatch.

20 Claims, 3 Drawing Sheets

(56) References Cited

U.S. PATENT DOCUMENTS

| | | | |
|---|---|---|---|
| 6,106,124 A | 8/2000 | Tarsia | |
| 6,229,564 B1 * | 5/2001 | High | G03B 15/00 348/94 |
| 6,348,964 B1 * | 2/2002 | Wagner | G01N 21/87 356/30 |
| 6,378,696 B1 * | 4/2002 | Smouha | A45C 9/00 206/18 |
| 7,270,474 B2 * | 9/2007 | Agnoff | G04B 3/006 368/206 |
| 7,614,749 B2 | 11/2009 | Vrachan et al. | |
| 8,045,421 B2 * | 10/2011 | Harley, Jr. | G04B 19/30 362/23.19 |
| 8,212,868 B2 * | 7/2012 | High | A47F 7/02 211/85.17 |
| 8,301,022 B1 | 10/2012 | McGuire et al. | |
| 8,462,206 B1 | 6/2013 | McGuire et al. | |
| 8,499,940 B2 * | 8/2013 | Johnson | A47F 5/025 211/1.53 |
| 8,613,521 B2 * | 12/2013 | Murata | G04B 19/30 362/23.01 |
| 8,668,379 B2 | 3/2014 | Nguyen et al. | |
| 2005/0254037 A1 | 11/2005 | Haske | |
| 2005/0265129 A1 * | 12/2005 | Agnoff | A47B 51/00 368/206 |
| 2006/0253212 A1 | 11/2006 | Weber et al. | |
| 2007/0251903 A1 * | 11/2007 | High | A47F 7/02 211/85.2 |
| 2009/0032478 A1 | 2/2009 | Johnson et al. | |
| 2010/0149550 A1 | 6/2010 | Diefenbacher et al. | |

FOREIGN PATENT DOCUMENTS

| | | | |
|---|---|---|---|
| DE | 10 2009 026 305 A1 | 2/2011 | |
| EP | 1 524 864 A1 | 4/2005 | |
| EP | 1524864 A1 * | 4/2005 | G06T 1/0007 |
| EP | 1 574 817 A1 | 9/2005 | |
| EP | 1 804 055 A1 | 7/2007 | |

* cited by examiner

PHOTOGRAPHY SYSTEM

BACKGROUND OF THE INVENTION

The invention relates to a photography system, a method for generating a multi-view picture of a wristwatch as well as a corresponding computer product comprising one or more computer readable media having computer executable instructions for performing the method steps.

Generating high-quality pictures and series of high-quality pictures of goods, as wristwatches for example, is essential for commercial success when using trading platforms, internet auctions or the like for selling goods to the buyer.

EP 1 804 055 A1 relates to a device for inspecting labels on containers having a camera for imaging the container surface equipped with labels wherein an optical mechanism is arranged between the camera and the container.

DE 197 09 050 A1 relates to a flat bed scanning system for three dimensional objects wherein the object is placed on a turntable that is driven by a motor and is illuminated by light sources.

DE 10 2009 026 305 A1 relates to a device for visually detecting a mobile object, e.g. a car, in an online shop having a motor for automated drive of a movement assembly and a camera for visually detecting the object, wherein the object is arranged on the movement assembly.

EP 1 574 817 A1 relates to a method and a system for scanning three-dimensional objects and a respective holder for the objects wherein a light beam from a laser is reflected from facets of a mirror which may be rotated by a drive motor and raised and lowered by a further motor.

DE 10 2005 016 233 B4 relates to an image data transmission method for use during production of dental prosthesis parts wherein the method involves producing digital image data in the form of an individual image or image sequences at a certain position.

However, none of these prior art methods and devices is specifically suited for generating a multi-view picture of a wristwatch.

SUMMARY OF THE INVENTION

It is, accordingly, an object of the invention to provide an improved photography system and an improved method for generating a multi-view picture of a wristwatch as well as the corresponding computer product comprising one or more computer readable media having computer executable instructions for performing the method steps.

The invention relates to a photography system comprising a rotating unit configured to rotate around a first axis, an illumination unit, a wristwatch holder, the wristwatch holder being mounted on the rotating unit, a camera unit, and a control unit. The control unit is configured to control the camera unit and the rotating unit such that a series of pictures of a wristwatch mounted on the wristwatch holder can be generated automatically. The pictures of the series of pictures show the wristwatch in different angles with respect to the camera unit.

Preferably the rotating unit comprises a stepper motor configured to rotate around the first axis in discrete steps. Preferably the rotating unit comprises a continuous motor configured to rotate around the first axis continuously. Preferably the rotating unit comprises a transmission.

Preferably the camera unit comprises optical components to focus the pictures taken by the camera unit. Preferably the camera unit comprises one or more lens(es) and/or a lens system. Preferably the camera unit comprises an objective lens. Preferably, the camera unit comprises an objective lens having a normal focal length, more preferably having a focal length between 18 and 200 mm, even more preferably between 35 and 105 mm, most preferably of 50 mm. The camera unit may also comprises a fish eye lens.

Preferably the series of pictures can be generated automatically. Preferably, the parameters for the series of pictures can be predetermined, e.g. the number of pictures to be taken, the respective angle for which the pictures are to be taken, the illumination of the pictures or the like, and then the system generates the pictures automatically for the respective parameters to form a series of pictures. Preferably the system is configured to concatenate the series of pictures to one single multiview picture, e.g. having the 360° view.

Preferably, the wristwatch holder comprises an arch-shaped and/or bent or rounded portion adapted for mounting a wristwatch such that the backside of the watchcase of the watch is, preferably fully, exposed.

Preferably, the arch-shaped portion comprises one or more parts being shaped and/or arranged such that the strap of the wristwatch when mounted on the arch-shaped portion is stretched and arranged in an arch-like or bent shape. This may be achieved, e.g., by an elongate bent part of the wristwatch holder whose outer surface is in, preferably contiguous, contact with the inner surface of the strap of the wristwatch when being mounted. The arch-shaped and/or bent or rounded portion may also be formed by a section of a larger three-dimensional body. For example, the arch-shaped portion may comprise a cube or any other parallel-epiped with, at least partially, rounded edges adapted to receive the strap of the wristwatch such that the strap of the wristwatch when mounted on the arch-shaped portion is arranged in an arch-like and/or bent or rounded shape.

The arch-shaped portion may also be discontinuous and comprise one or more regions where the wristwatch is not being supported by the arch-shaped portion. For example, several intermittently arranged elements may support the strap of the wristwatch in an arch-like or bent shape. For example, the arch-shaped portion can comprise a plurality of supporting elements such as rods, which are located along an imaginary arch. The wristwatch can be mounted on the supporting elements such that the inner surface of the watch is in contact with the peripheral surface of said supporting elements. When the inner surface of the strap of the watch is in contact with the peripheral surface of the supporting elements, the strap of the wristwatch comprises an arch-shaped form. For this purpose it is preferable to provide at least five supporting elements. However, the wristwatch may also be mounted on only three or four supporting elements which may lead to a less bent or curved shape of the strap. Instead, the strap may also have an almost triangular or rectangular outline once being mounted.

Preferably the wristwatch holder comprises a holding portion.

Preferably the arch-shaped portion is rotatably mounted on the holding portion such that the arch-shaped portion can be rotated around a second axis different from the first axis and preferably being perpendicular to the first axis.

Preferably the holding portion is height-adjustable.

Preferably the arch-shaped portion can be rotated around the second axis by an angle of at least 3°, preferably of at least 5°, more preferably of at least 10°.

Preferably the arch-shaped portion can be rotated around the second axis by an angle between 1° and 50°, preferably between 3° and 40°, more preferably between 5° and 30°.

Preferably the arch-shaped portion comprises a flexible material in order to stretch a watch strap of a watch being mounted on the arch-shaped portion. Preferably the arch-shaped portion can be bent or compressed such that the wristwatch can be mounted on the arch-shaped portion in the bent or compressed state and when the arch-shaped portion is unbent or relaxed the wristwatch is stretched on the arch-shaped portion.

Preferably the wristwatch holder is part of a set comprising two or more holding portions of different height.

Preferably the wristwatch holder is part of a set comprising two or more holding portions of different size.

Preferably at least the arch-shaped portion of the wristwatch-holder is at least partially, preferably completely, white or transparent. More preferably the entire wristwatch-holder is at least partially, preferably completely, white or transparent.

Preferably the arch-shaped portion and/or the holding portion of the wristwatch holder comprises at least one of the following materials: PE, PP, PVC, PTFE, wood, metal, coated metal.

Preferably the system further comprises a chamber, wherein the interior of the chamber comprises the wristwatch holder.

Preferably a bottom portion of the chamber comprises a through-hole and the wristwatch holder is mounted on the rotating unit by means of a shaft extending through the through-hole.

Preferably both the rotating unit and the wristwatch holder comprise magnetic/magnetized elements such that a rotation of the rotating unit also rotates the wristwatch holder. Preferably the rotating unit forms a part of the bottom of the chamber.

Preferably the illumination unit comprises at least one light dispersive element. In the context of the present application, the term "light dispersive" preferably relates to an element that is light dispersive and/or light reflective. Preferably, the term "light dispersive" comprises all forms of dispersion and reflection of light, in particular diffuse reflection, retro reflection, and/or multiple reflections.

Preferably, the at least one light dispersive element is attached to one or more inner sidewalls of the chamber, to the inner top surface of the chamber and/or to the inner bottom surface of the chamber. As an alternative or in addition, the at least one light dispersive element preferably forms at least one part of one or more sidewalls of the chamber, of the top of the chamber and/or of the bottom of the chamber.

Preferably the illumination unit comprises at least one illumination element comprising at least one light source. Preferably, the at least one illumination element is attached to one or more inner sidewalls of the chamber, to the inner top surface of the chamber and/or to the inner bottom surface of the chamber. As an alternative or in addition, the at least one illumination element forms at least one part of one or more sidewalls of the chamber, of the top of the chamber and/or of the bottom of the chamber. Preferably the at least one illumination element is forming one or more sidewalls of the chamber, the top of the chamber and/or the bottom of the chamber. Preferably each of the sidewalls of the chamber, the top of the chamber and/or the bottom of the chamber can be formed of a respective illumination element. Preferably the chamber comprises fastening means configured to fasten the one or more illumination elements thereby forming the chamber. Preferably the chamber comprises brackets or at least one frame as fastening means.

Preferably the at least one light source is dimmable.

Preferably the at least one light source is at least one of the following: light emitting diode —LED, incandescent light bulb, fluorescent lamp, compact fluorescent lamp, cold cathode fluorescent lamp, high-intensity discharge lamp.

Preferably the at least one illumination element comprises an array of light sources, preferably an array of clusters of light sources. Preferably the array comprises 9 clusters. More preferably the array comprises 9 clusters in a 3×3 arrangement. Preferably each cluster comprises at least one light source.

Preferably the at least one illumination element comprises one extensive light source forming at least one part of a sidewall of the chamber, of the top of the chamber and/or of the bottom of the chamber.

Preferably at least a part of the array of light sources and/or at least a part of at least one of the clusters is configured to be switched on and off separately. Preferably, by switching on and off at least a part of the array of light sources and/or at least a part of at least one of the clusters of the array, the whole array and/or cluster is dimmable.

Preferably the system comprises at least one diffuser element. The diffuser element is preferably located between the illumination element and the wristwatch holder. Preferably the term "diffuser" refers to any device that diffuses or spreads out light in a diffuse way.

Preferably the diffuser element is translucent and/or opaque. Preferably the diffuser element comprises at least one of the following: milk glass, opaque translucent glass, opaque translucent plastic, opaque translucent Teflon, ground glass, and translucent material having a matte finish.

Preferably one sidewall of the chamber comprises a through-hole and preferably the photography system further comprises a tube having a distal end and a proximal end, the distal end being attached to said through-hole.

Preferably the tube has a conical or cylindrical or bent or curved shape. Preferably, the tube has a polygonal shape.

Preferably the tube is attached to the through-hole of the sidewall of the chamber at an angle of 0° to 60°, preferably 20° to 50°, with respect to the bottom surface of the chamber.

Preferably the inner wall of the tube is at least partially white. Preferably, the inner wall of the tube has a matte finish. Preferably, the inner wall of the tube is completely white. Preferably, the inner wall of the tube is beige. Preferably, the inner wall of the tube has a light color.

Preferably the tube is located between the chamber and the camera unit such that the camera unit is configured to take the series of pictures of the wristwatch mounted on the wristwatch holder through the tube.

Preferably the control unit is configured to communicate with a second control unit.

Preferably the second control unit is at least one of the following: a personal computer, a tablet personal computer, a mobile communication device and a personal digital assistant.

Preferably the second control unit comprises an input unit wherein the second control unit is configured to transmit at least one command inputted in the input unit by a user to the control unit and wherein the control unit is configured to control the rotating unit, the camera unit and the illumination unit on the basis of the user command received from the second control unit.

Preferably, the input unit is at least one of the following: a touch screen, a keyboard, a computer mouse, a tactile input device, and a microphone.

Preferably the second control unit comprises a display unit and the second control unit is configured to display images of the camera unit received by the control unit on the display unit.

Preferably the display unit comprises at least one of the following: a liquid crystal display, an organic liquid crystal display. Preferably the display unit and the input unit are comprised in one unit, more preferably in a touch screen, even more preferably in a capacitive touch screen.

Preferably the control unit and the second control unit are configured to be remotely connected, preferably using one of the following: wide-area-network connection, internet connection, Bluetooth connection, local area network, wireless local area network, universal serial bus.

Preferably the system further comprises an input unit wherein the control unit is configured to control the rotating unit, the camera unit and the illumination unit on the basis of the user command inputted in the input unit.

Preferably the system further comprises a display unit. Preferably the display unit is configured to display images of the camera unit received by the control unit.

Preferably the display unit comprises at least one of the following: a liquid crystal display, an organic liquid crystal display. Preferably the display unit and the input unit are comprised in one unit, more preferably in a touch screen, even more preferably in a capacitive touch screen.

Preferably the photography system comprises the second control unit.

Preferably the system further comprises a connection unit configured to establish a connection to a wide-area-network, preferably the Internet.

Preferably the rotating unit is configured to rotate the wristwatch holder by an angle of at least 270°, preferably of at least 300°, more preferably of at least 330°, most preferably of 360°.

Preferably the camera unit has an optical axis which is inclined with respect to the bottom part and/or top part of the chamber. Preferably the angle between the optical axis and the bottom part and/or top part of the chamber is between 0° and 60°. More preferably the angle is between 20° and 50°. Preferably a lens/lens system of the camera unit has an optical axis which is inclined with respect to the bottom part and/or top part of the chamber.

The invention also relates to a method of generating a multi-view picture of a wristwatch comprising the following steps: providing a photography system comprising a wristwatch holder being mounted on a rotating unit and a camera unit, mounting a wristwatch on the wristwatch holder, rotating the rotating unit around a first axis, generating a series of pictures of the wristwatch mounted on the wristwatch holder by means of the camera unit, wherein the pictures of the series of pictures show the wristwatch at different angles with respect to the camera unit, and merging the pictures to a multi-view picture and/or movie of the wristwatch.

Preferably the photography system is a photography system as described above.

Preferably the method further comprises the step of determining the angle between the positions of each picture of the series of pictures.

Preferably the angle between the positions of each picture of the series of pictures is less than 10°, preferably less than 5°, more preferably less than 2° and most preferably less than 1°.

Preferably the method further comprises the step of checking the correct placement of the wristwatch on the wristwatch holder. Preferably the step of checking the correct placement of the wristwatch on the wristwatch holder is performed using a viewfinder displayed on a display unit of the photography system and/or a display unit of the second control unit connected to the photography system.

Preferably the method further comprises the step of: uploading the series of pictures and/or the merged picture to at least one server in a wide-area-network. Preferably the wide-area-network is the Internet. Preferably the series of pictures and/or the merged picture is uploaded to a trading platform, online shop, online marketplace and/or Internet auction running on the at least one server.

Preferably the method further comprises the step of concatenating meta information of the watch with the merged picture of the watch. Preferably the meta information picture is uploaded to at least one/to the at least one server in a wide-area-network, preferably the Internet. Preferably meta-information of the watch comprises at least one of the following: information on the model name, the name of the manufacturer, the brand of the watch, model number, the vendor, the serial number, the reference number, the server where the information is to be uploaded, the price of the watch. Preferably the meta-information is uploaded to a trading platform, online shop, online marketplace and/or Internet auction running on the at least one server.

Preferably the method further comprises the step of setting at least one light condition of an illumination unit of the photography system on the basis of at least one of the following: model of the wristwatch, color of the wristwatch, shape of the wristwatch, size of the wristwatch, user preference, material of the wristwatch, texture of the wristwatch, model number, and reference number.

Preferably, the light condition for the respective wristwatch model can be stored on a server and can be retrieved by the control unit from the server upon user request and/or automatic recognition of the wristwatch model mounted on the wristwatch holder.

Preferably at least one/the at least one light condition of an/the illumination unit of the photography system is adjusted for at least two different angles of the different angles of the series of pictures, preferably for each angle of the different angles of the series of pictures. Preferably the at least one light condition of the illumination unit of the photography system is adjusted for sub-series of the series of pictures, wherein the sub-series comprises at least one picture.

Preferably at least one/the at least one light condition of an/the illumination unit is stored in a memory unit of the photography system and/or on at least one server in a wide-area-network, preferably the Internet.

Preferably at least one/the at least one light condition of an/the illumination unit is determined using at least one of the following: a light sensor, a brightness meter, the camera unit, a second camera unit.

The invention also relates to a computer program product comprising one or more computer readable media having computer executable instructions for performing the steps of the method as described above.

The invention also relates to a method of providing a photography system of any of the preceding embodiments to a vendor of goods. Preferably, the method comprises the step of providing the system to the vendor, preferably on a lend- or lease-basis. Preferably the method comprises the step of receiving a series of pictures generated with the system preferably using a method of generating a multi-view picture of a wristwatch as described above. Preferably the method comprises the step of merging the series of pictures to a multiview picture. Preferably the method comprises the step of presenting the picture on a trading platform, online marketplace, online shop and/or Internet auction.

It is understood by the skilled person that the present invention is not restricted to wristwatches but is applicable to any good that is to be presented in a multiview picture, as for example: electronic devices, mobile communication devices, consumer products, jewelry, and other luxury products such as handbags. It is also understood by the skilled person that the photography system of the present invention is fully scalable to any size and therefore does not necessarily need to be restricted to items having the same dimensions as a watch. For example, the photography system of the present invention can be scaled to generate a series of pictures of a car or anything having the same size as a car without departing from the gist and the scope of invention.

The following aspects show further preferred embodiments of the present invention:

1. Photography system comprising:
   a rotating unit configured to rotate around a first axis,
   an illumination unit,
   a wristwatch holder, the wristwatch holder being mounted on the rotating unit,
   a camera unit, and
   a control unit,
   wherein the control unit is configured to control the camera unit and the rotating unit such that a series of pictures of a wristwatch mounted on the wristwatch holder can be generated automatically, the pictures of the series of pictures showing the wristwatch in different angles with respect to the camera unit.
2. Photography system according to aspect 1, wherein the wristwatch holder comprises an arch-shaped portion adapted for mounting a wristwatch such that the backside of the watchcase of the watch is, preferably fully, exposed.
3. Photography system according to aspect 2, wherein the wristwatch holder comprises a holding portion.
4. Photography system according to aspect 3, wherein the arch-shaped portion is rotatably mounted on the holding portion such that the arch-shaped portion can be rotated around a second axis being perpendicular to the first axis.
5. Photography system according to aspect 3 or 4, wherein the holding portion is height-adjustable.
6. Photography system according to any of aspects 2 to 5, wherein the arch-shaped portion can be rotated around a second axis being perpendicular to the first axis by an angle of at least 3°, preferably of at least 5°, more preferably of at least 10°.
7. Photography system according to any of aspects 2 to 6, wherein the arch-shaped portion can be rotated around a second axis being perpendicular to the first axis by an angle between 1° and 50°, preferably between 3° and 40°, more preferably between 5° and 30°.
8. Photography system according to any of aspects 2 to 7, wherein the arch-shaped portion comprises a flexible material in order to stretch a watch strap of a watch being mounted on the arch-shaped portion.
9. Photography system according to any of aspects 3 to 8, comprising two or more holding portions of different height.
10. Photography system according to any of aspects 2 to 9, comprising two or more arch-shaped portions of different size.
11. Photography system according to any of aspects 2 to 10, wherein at least the arch-shaped portion of the wristwatch-holder is at least partially, preferably completely, white or transparent.
12. Photography system according to any of aspects 2 to 11, wherein the arch-shaped portion and/or the holding portion of the wristwatch holder comprises at least one of the following materials: PE, PP, PVC, PTFE, wood, metal, coated metal.
13. Photography system according to any of aspects 1 to 12, further comprising a chamber, wherein the interior of the chamber comprises the wristwatch holder.
14. Photography system according to aspect 13, wherein a bottom portion of the chamber comprises a through-hole and wherein the wristwatch holder is mounted on the rotating unit by means of a shaft extending through the through-hole.
15. Photography system according to aspect 13 or 14, wherein the illumination unit comprises at least one light dispersive element, wherein the at least one light dispersive element is attached to one or more inner sidewalls of the chamber, to the inner top surface of the chamber and/or to the inner bottom surface of the chamber, and/or wherein the at least one light dispersive element is forming at least one part of one or more sidewalls of the chamber, of the top of the chamber and/or of the bottom of the chamber.
16. Photography system according to any of aspects 13 to 15, wherein the illumination unit comprises at least one illumination element comprising at least one light source, wherein the at least one illumination element is attached to one or more inner sidewalls of the chamber, to the inner top surface of the chamber and/or to the inner bottom surface of the chamber, and/or wherein the at least one illumination element is forming at least one part of one or more sidewalls of the chamber, of the top of the chamber and/or of the bottom of the chamber.
17. Photography system according to aspect 16, wherein the at least one light source is dimmable.
18. Photography system according to aspect 16 or 17, wherein the at least one light source is at least one of the following: light emitting diode—LED, incandescent light bulb, fluorescent lamp, compact fluorescent lamp, cold cathode fluorescent lamp, high-intensity discharge lamp.
19. Photography system according to any of aspects 16 to 18, wherein the at least one illumination element comprises an array of light sources, preferably an array of clusters of light sources, preferably an array of 9 clusters, more preferably in a 3×3 arrangement, wherein further preferably each cluster comprises light sources.
20. Photography system according to aspect 19, wherein at least a part of the array of light sources and/or at least a part of at least one of the clusters is configured to be switched on and off separately.
21. Photography system according to any of aspects 16 to 20, further comprising at least one diffuser element wherein the diffuser element is located between the illumination element and the wristwatch holder.
22. Photography system according to any of aspects 13 to 21, wherein a sidewall of the chamber comprises a through-hole and wherein the photography system preferably further comprises a tube having a distal end and a proximal end, the distal end being attached to said through-hole.
23. Photography system according to aspect 22, wherein the tube has a conical or cylindrical or bent shape.
24. Photography system according to aspect 22 or 23, wherein the tube is attached to the through-hole of the sidewall of the chamber under an angle of 0° to 60°, preferably 20° to 50°, with respect to the bottom surface of the chamber.

25. Photography system according to any of aspects 22 to 24, wherein the inner wall of the tube is at least partially, preferably completely, white.
26. Photography system according to any of aspects 22 to 25, wherein the tube is located between the chamber and the camera unit such that the camera unit is configured to take the series of pictures of the wristwatch mounted on the wristwatch holder through the tube.
27. Photography system according to any of aspects 1 to 26, wherein the control unit is configured to communicate with a second control unit.
28. Photography system according to aspect 27, wherein the second control unit comprises an input unit and wherein the second control unit is configured to transmit at least one command inputted in the input unit by a user to the control unit and wherein the control unit is configured to control the rotating unit, the camera unit and the illumination unit on the basis of the user command received from the second control unit.
29. Photography system according to aspect 27 or 28, wherein the second control unit comprises a display unit and wherein the second control unit is configured to display images of the camera unit received by the control unit on the display unit.
30. Photography system according to any of aspects 1 to 29, wherein the control unit and the second control unit are configured to be remotely connected, preferably using one of the following: wide-area-network connection, internet connection, Bluetooth connection, local area network, wireless local area network, universal serial bus.
31. Photography system according to any of aspects 1 to 30, further comprising an input unit wherein the control unit is configured to control the rotating unit, the camera unit and the illumination unit on the basis of the user command inputted in the input unit.
32. Photography system according to any of aspects 1 to 31, further comprising a display unit wherein the display unit is configured to display images of the camera unit received by the control unit.
33. Photography system according to any of aspects 27 to 32, wherein the photography system comprises the second control unit.
34. Photography system according to any of aspects 1 to 33, further comprising a connection unit configured to establish a connection to a wide-area-network, preferably the Internet.
35. Photography system according to any of aspects 1 to 34, wherein the rotating unit is configured to rotate the wristwatch holder by an angle of at least 270°, preferably of at least 300°, more preferably of at least 330°, most preferably of 360°.
36. Photography system according to any of aspects 1 to 35, wherein the camera unit has an optical axis which is inclined with respect to the bottom part and/or top part of the chamber, preferably by 0° to 60°, more preferably by 20° to 50°.
37. Method of generating a multi-view picture of a wristwatch comprising the following steps:
providing a photography system comprising a wristwatch holder being mounted on a rotating unit and a camera unit, preferably a photography system according to any of the preceding aspects,
mounting a wristwatch on the wristwatch holder,
rotating the rotating unit around a first axis,
generating a series of pictures of the wristwatch mounted on the wristwatch holder by means of the camera unit, wherein the pictures of the series of pictures show the wristwatch at different angles with respect to the camera unit, and
merging the pictures to a multi-view picture and/or movie of the wristwatch.
38. Method according to aspect 37, further comprising the step of determining the angle between the positions of each picture of the series of pictures.
39. Method according to aspect 37 or 38, wherein the angle between the positions of each picture of the series of pictures is less than 10°, preferably less than 5°, more preferably less than 2° and most preferably less than 1°.
40. Method according to any of aspects 37 to 39, further comprising the step of checking the correct placement of the wristwatch on the wristwatch holder using a viewfinder displayed on a display unit of the photography system.
41. Method according to any of aspects 37 to 40, further comprising the step of uploading the series of pictures and/or the merged picture to at least one server in a wide-area-network, preferably the Internet.
42. Method according to any of aspects 37 to 41, further comprising the step of concatenating meta information of the watch with the merged picture of the watch and preferably uploading the meta information picture to at least one/to the at least one server in a wide-area-network, preferably the Internet.
43. Method according to any of aspects 37 to 42 further comprising the step of setting at least one light condition of an illumination unit of the photography system on the basis of at least one of the following: model of the wristwatch, color of the wristwatch, shape of the wristwatch, size of the wristwatch, user preference.
44. Method according to any of aspects 37 to 43, wherein at least one/the at least one light condition of an/the illumination unit of the photography system is adjusted for at least two different angles of the different angles of the series of pictures, preferably for all angles of the different angles of the series of pictures.
45. Method according to any of aspects 37 to 44, wherein at least one/the at least one light condition of an/the illumination unit is stored in a memory unit of the photography system and/or on at least one server in a wide-area-network, preferably the Internet.
46. Method according to any of aspects 37 to 45, wherein at least one/the at least one light condition of an/the illumination unit is determined using at least one of the following: a light sensor, a brightness meter, the camera unit, a second camera unit.
47. Computer program product comprising one or more computer readable media having computer executable instructions for performing the steps of the method of any of aspects 37 to 46.

The subject matter of the invention will be explained in more detail in the following text with reference to preferred exemplary embodiments which are illustrated in the attached drawings, as follows:

DETAILED DESCRIPTION OF THE INVENTION

In principle, identical parts are provided with the same reference symbols in the figures.

Figure 1:
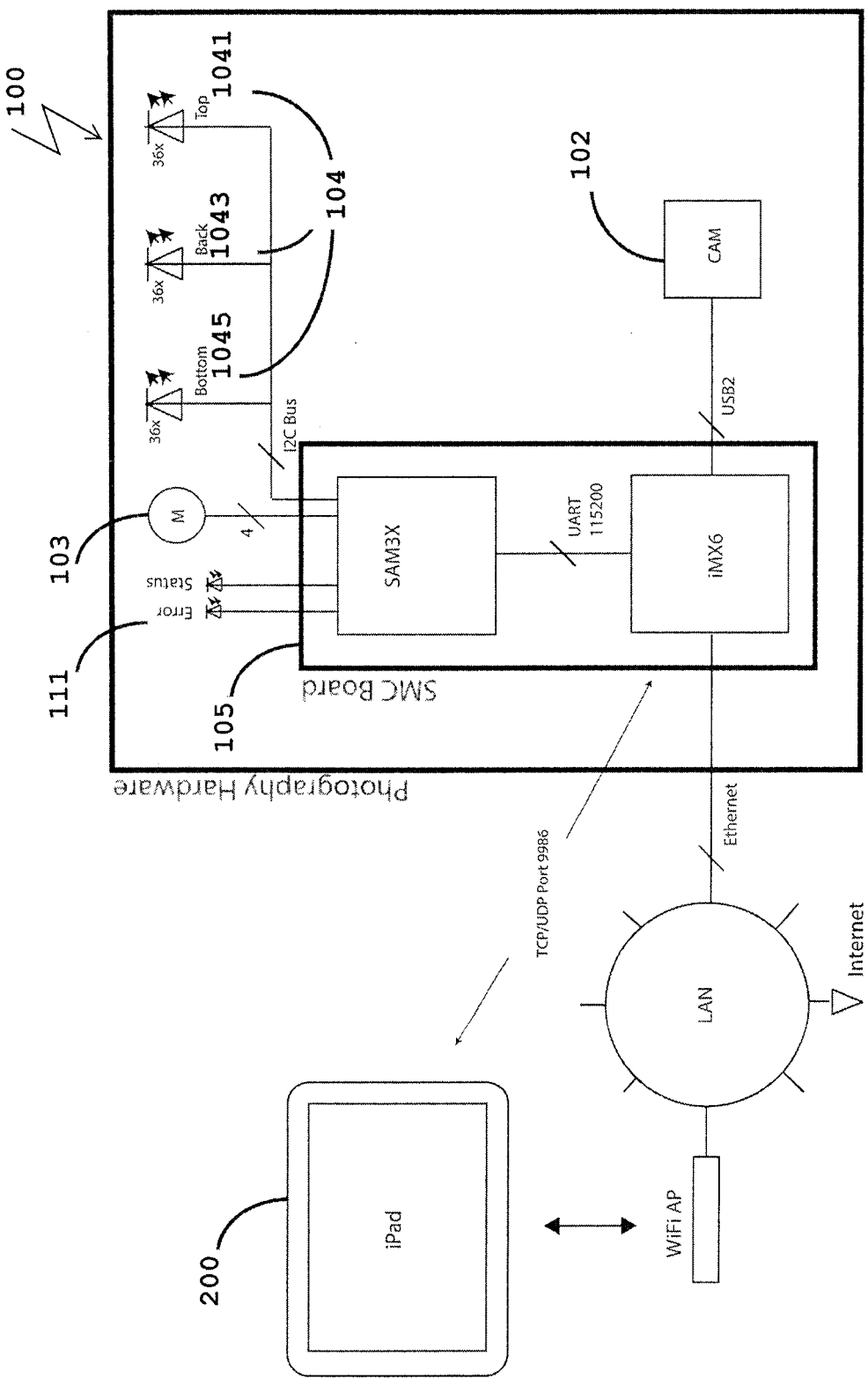
FIG. 1 schematically shows a photography system according to an embodiment of the present invention.

FIG. 1 schematically shows a photography system 100 according to an embodiment of the present invention. The photography system 100 comprises a camera unit 102, a rotating unit 103, an illumination unit 104, a control unit 105, and a status indication unit 111. The photography system 100, in particular the control unit 105, is in communication with a second control unit 200. In the present embodiment, the photography system 100 is connected to the second control unit 200 via a local area network/a wireless local area network. In the present embodiment, the second control unit 200 is a tablet computer.

The rotating unit 103 is configured to rotate around a first axis and a wristwatch holder 106 (explained in detail in FIGS. 3 and 4 and also shown in FIG. 2) is mounted on the rotating unit 103. The illumination unit 104 comprises three illumination elements 1041, 1043, and 1045, each comprising 9 clusters with 4 LEDs each, i.e. 36 LEDs. In the present embodiment, each LED is individually adjustable, i.e. dimmable, leading to more than 4000 levels of brightness. Therefore a unique light set-up can be created and different illumination needs for different types of watches can be taken into account.

The illumination elements 1041, 1043 and 1045 form part of a bottom, a back, and a top of a chamber 107 which will be explained in detail in FIG. 2. The status indication unit 111 comprises two status LEDs indicating readiness of the system or an error state.

The camera unit 102, the rotating unit 103, and the illumination unit 104 as well as the status indication unit 111 are connected to the control unit 105.

The second control unit 200 comprises an input unit, i.e. a touch screen in the present embodiment. The user of the photography system 100 can input his/her user commands and preferences, e.g. information on how a series of pictures of a wristwatch mounted on the wristwatch holder 106 should be automatically taken by the photography system 100. The user commands and preferences are then submitted by the second control unit 200 to the control unit 105. The control unit 105 processes the user commands and preferences sent by the second control unit 200. The control unit 105 controls the rotating unit 103, the camera unit 102 and the illumination unit 104 on the basis of the user command to generate a series of pictures, wherein for each picture the rotating unit 103 is rotated around the first axis by a predetermined degree, e.g. 2°. Therefore, a series of pictures can be generated, wherein each picture is taken under a different angle with respect to the optical axis of the camera unit 102. By later merging these pictures a multiview picture can be created which shows the wristwatch, e.g., in a 360° view.

The process of taking a series of pictures which can be merged to a multiview picture can be exemplarily described as follows:

The user places a wristwatch on the wristwatch holder 106 in the photography system 100 and checks the correct placement utilizing a viewfinder of a control app on the second control unit 200. He/she then enters or uploads a defined set of meta information and starts the photography process using the control app. The meta information refers to the wristwatch and comprises among others information about the model of the wristwatch. The user additionally can input predetermined commands and predetermined parameters into the input unit of the second control unit 200. The commands and the parameters can comprise the information on the set up of the illumination unit 104, on how many pictures are to be taken, which range of degrees is to be covered by the series of pictures, e.g. 360°, and/or on the step size of rotation around the first axis.

The second control unit 200, having a WiFi-connection to an access point on the same IP-network, the photography system 100 is connected to, transfers the metadata as well as a respective command to the control unit 105.

The control unit 105 sets the appropriate lighting conditions for the series of pictures to be taken of the watch by controlling the three illumination elements 1041, 1043, and 1045 on top, bottom and back of the chamber 107 to a specific preset.

Thereafter the rotating unit 103 is controlled by the control unit 105 to rotate around the first axis by several degrees and the camera unit 102 takes an image of the watch in its current position.

The image is developed, filtered and compressed to a JPEG file and collected on a local memory unit attached to the control unit 105. Alternatively or in addition, the images can be collected on the local memory unit attached to the control unit 105 as raw files or in any other suitable format as dng files, tiff files or png files. This process is repeated multiple times until the watch has been rotated by a certain number of degrees, e.g. 360 degrees. After all images have been taken, the control unit 105 initiates a background upload of the images together with their metadata to a server system archiving the data and providing it online for trading purposes. Preferably, the control unit 105 transmits the images first to a display of the photography system and/or the second control unit 200 allowing the user for reviewing and approving the images to be uploaded to the server. After approval by the user, the control unit 105 initiates the background upload of the images.

The activity-status of the photography hardware is fed back to the user by the status indication unit 111 comprising two status LEDs indicating readiness for photography and activity of the system 100 or an error state.

Figure 2:
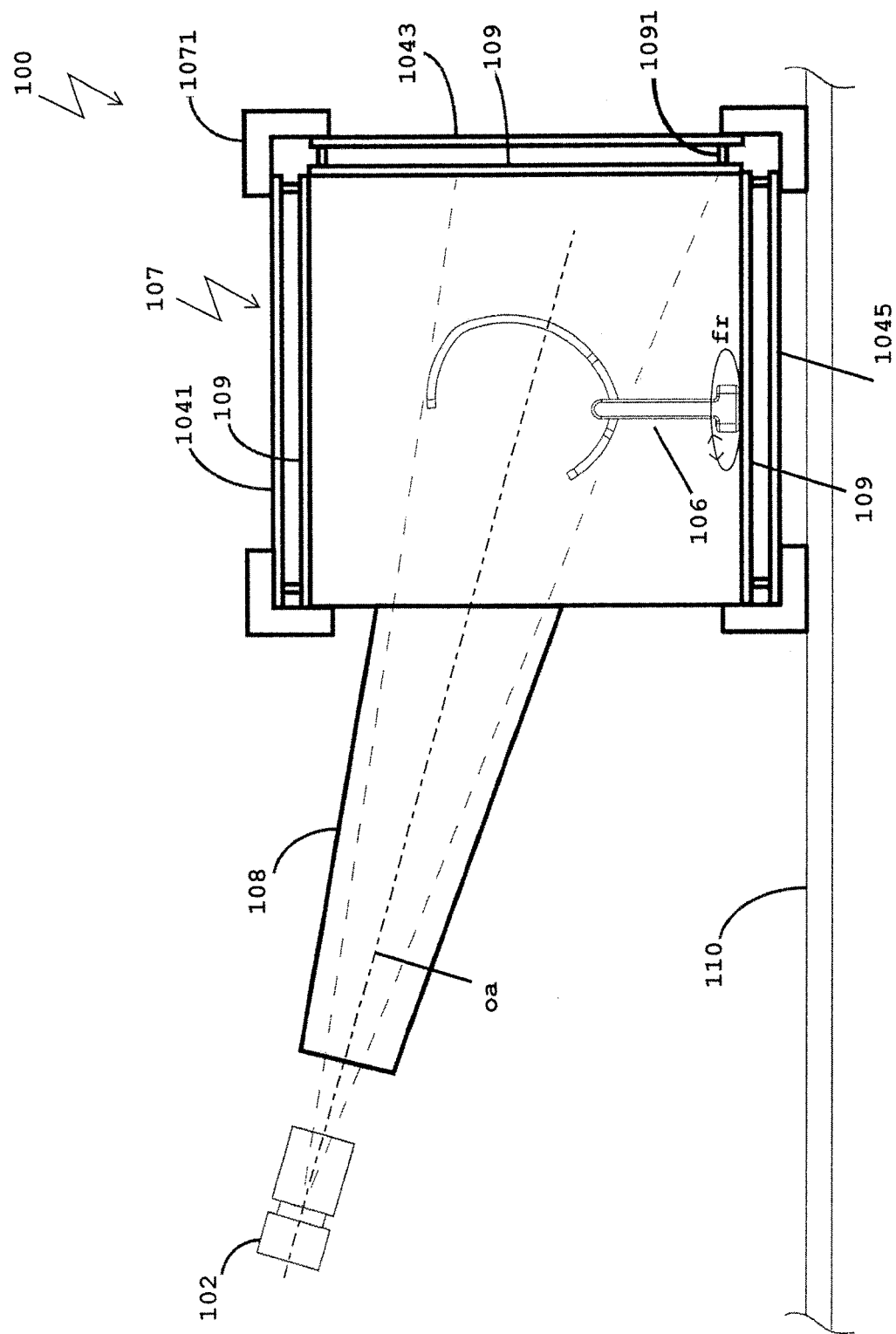
FIG. 2 schematically shows a photography system according to an embodiment of the present invention.

FIG. 2 schematically shows a photography system 100 according to an embodiment of the present invention.

The photography system 100 preferably comprises all elements as shown in FIG. 1. In addition, the system 100 further comprises a wristwatch holder 106, a chamber 107 and a tube 108. The system 100 may be mounted on a base plate 110. The camera unit 102 may be mounted on a specific mounting (not shown).

The three illumination elements 1041, 1043 and 1045 form the top, the back and the bottom of the chamber 107. Alternatively, the illumination elements may be attached to top, back and bottom surfaces of the chamber 107. Two light dispersive elements (not shown) form (or are attached to) the sidewalls of the chamber 107. The illumination elements 1041, 1043 and 1045 as well as the sidewalls of the chamber may be connected via a frame 1071.

The wristwatch holder 106 is located inside the chamber 107. The bottom portion of the chamber 107 may comprise a through-hole and the wristwatch holder 106 may be mounted on the rotating unit 103 (not shown) by means of a shaft extending through the through-hole. The rotating unit 103 may also be provided within the chamber 107 or may be part of the bottom surface or wall of the chamber 107. On the inner surfaces of the illumination elements 1041, 1043 and 1045 diffuser elements 109 may be mounted using, e.g., diffuser mounts 1091. The diffuser elements 109 may comprise white translucent plastic or another opaque material and ensure that the light of the clusters of LEDs of the illumination elements 1041, 1043 and 1045 is not seen on the pictures as point-like light sources but as one single homogeneous light element. However, it is understood by the skilled person that one single homogeneous light source in the illumination elements 1041, 1043 and 1045 would lead to a comparable result without the need of the diffuser element 109.

The sidewall of the chamber 107 which is closest to the camera unit 102 comprises a through-hole. The tube 108 is attached to or mounted adjacent to the through-hole of said sidewall of the chamber 107. The tube 108 preferably has a conical shape with the large opening being attached to the through-hole of the sidewall of the chamber 107. The tube 108 is part of the optical system for the camera unit 102. To avoid the occurrence of a dark spot in the pictures of the watches, which may be caused by lack of illumination from the front due to the through-hole, the inner surface of the tube 108 is preferably white. Thus, the white inner surface of the tube 108 reflects or scatters light from the inside of the chamber 107 back towards the mounted watch and, thus, causes a more homogeneous illumination. While this purpose may be best achieved with a conical tube 108, a tube having another shape may lead to a similar effect. For example, the tube may be cylindrical (with an elliptical, circular, rectangular or quadratic cross section). The cross section of the tube may also decrease towards the through-hole in a non-linear manner.

In the present embodiment, the tube 108 is attached to the through-hole of the sidewall of the chamber 107 under an angle of 30° with respect to the bottom surface of the chamber 107. However, in other embodiments, this angle can be varied. Yet, an arrangement with an inclination of the tube axis with respect to the horizontal plane is preferable as it leads to an improved image quality in terms of perspective and illumination. Nevertheless, depending on the orientation of the mounted watch the tube 108 may also be mounted perpendicular to the sidewall of the chamber 107. It is preferred that the front view of a watch mounted on the wristwatch holder 106 is approximately perpendicular to the optical axis oa of the camera unit 102. The optical axis oa is shown as a dash-dotted line in FIG. 2. However, it is even more preferred that the angle between the front view of a watch mounted on the wristwatch holder 106 and the optical axis oa is between 80° to 100°, preferably between 85° to 95°. However, it can also be preferred that the angle between the front view of a watch mounted on the wristwatch holder 106 and the optical axis oa is between 80° to 89° or 91° to 100° in order to avoid distorting reflections which might occur in case of an exactly perpendicular arrangement. During use, the user places a wristwatch on the wristwatch holder 106 in the chamber 107 and checks the correct placement using, e.g., a viewfinder of, e.g., a control app on the second control unit 200.

He/she then starts the photography process by inputting a respective command in the second control unit 200.

The second control unit 200 transfers the command to the control unit 105.

The control unit 105 sets the appropriate lighting conditions for the series of pictures to be taken of the watch by controlling the three illumination elements 1041, 1043, and 1045 on top, bottom and back of the chamber 107. The parameters of the appropriate lighting conditions may correspond to a predetermined standard. Different standard parameters may be saved in the control unit for different models and sizes of watches. The user may, for example, input the type of watch using the second control unit 200 which triggers a certain set of illumination parameters to be uploaded. Alternatively, the control unit 105 may be adapted to identify the type of watch analyzing one or more pictures taken by the camera unit 102. For example, certain data such as size, contour and the like of different watch models may be saved in the control unit and compared with corresponding data extracted from one or more pictures taken by the camera unit 102. The result of this automatic analysis may be shown on a display and optionally be verified by the user.

The control unit 105 may further be adapted to optimize the illumination parameters by taking one or more pictures of the mounted watch, analyzing the one or more pictures for, e.g., inhomogeneous illumination, shadows and/or reflections, and changing the illumination parameters in order to improve the illumination of the watch. The system may also comprise one or more additional sensors to measure illumination.

In case this optimization process does not lead to a result complying to certain predetermined minimum requirements, the control unit may be adapted to prompt the user to re-mount the watch in a different height and/or with a different rotation. The above optimization scheme may then be repeated one or more times.

Once the appropriate lighting conditions are set, a first picture to be saved is taken of the watch in its current position. Thereafter the rotating unit 103 is controlled by the control unit 105 to rotate around the first axis by a predetermined angle, e.g. several degrees, and the camera unit 102 takes another picture of the watch in its current position. The rotation around the first axis is shown as a circle fr in FIG. 2.

The pictures are stored on a local memory unit attached to the control unit 105. This process is repeated multiple times until the watch has been rotated by a certain number of degrees, e.g., 360 degrees. After all pictures have been taken, the control unit 105 initiates a background upload of the images together with their metadata to a server system archiving the data and providing it online for trading purposes.

As discussed above, it can be preferred that the control unit 105 transmits the images first to a display of the photography system and/or the second control unit 200 allowing the user for reviewing and approving the images to be uploaded to the server. After approval by the user, the control unit 105 initiates the background upload of the images.

While the illumination parameters in many cases need only be optimized once for all pictures to be taken of a specific watch, the control unit may also verify the illumination parameters after rotation of the watch around a predetermined minimum angle and re-adjust the illumination parameters if necessary.

Figure 3:
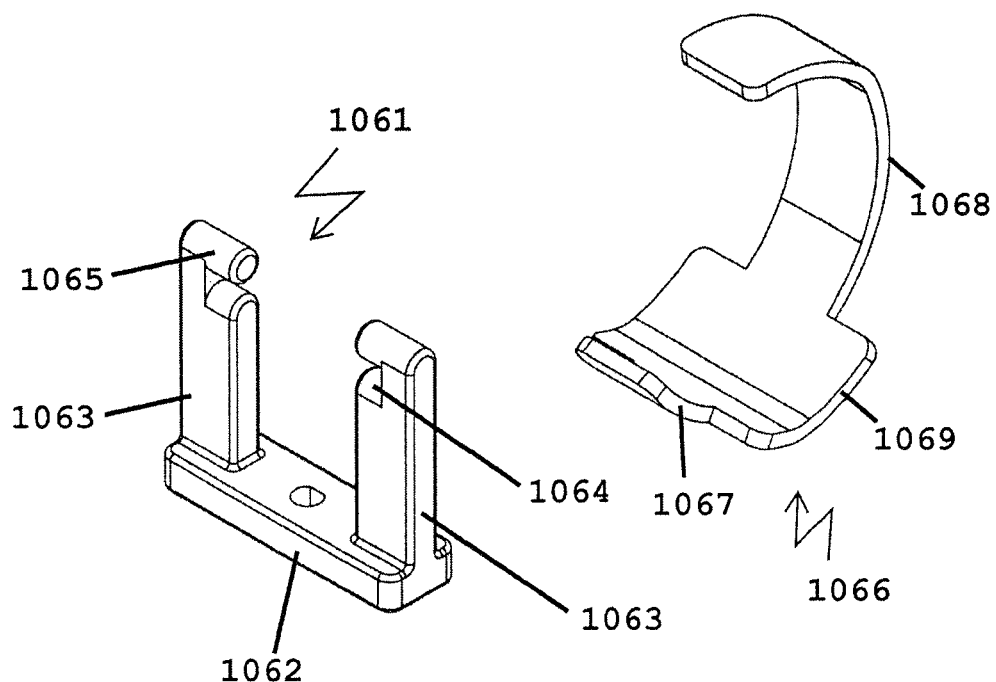
FIG. 3 schematically shows a wristwatch holder according to an embodiment of the present invention.

FIG. 3 schematically shows an exploded view of a wristwatch holder 106 according to an embodiment of the present invention.

The wristwatch holder 106 comprises a holding portion 1061 and an arch-shaped portion 1066.

The holding portion 1061 may comprise a base 1062 and two columns 1063 mounted on the base 1062. The base 1062 may comprise a through-hole configured to receive a shaft to be mounted on the rotating unit 103. However, the base 1062 may also be mounted by other means to the rotating unit 103. Preferably the through-hole has a shape such that the base 1062 can be mounted on the shaft only in one predetermined orientation. The two columns 1063 comprise each a receiving portion 1064 adapted to engage with the arch-shaped portion 1066. In the shown embodiment the receiving portion consists of a notch with a curved seating. The opposite side of the notch is also formed by a curved or round element 1065. The receiving portion 1064 is adapted to receive portion 1069 of the arch-shaped portion 1066 which may freely move so as to allow for a rotation of the arch-shaped portion 1066 around a second axis which will be described with reference to FIG. 4.

Although the two columns 1063 have a fixed height in the current embodiment, the two columns 1063 can comprise means for adjusting the height of the two columns. In addition or alternatively, the two columns can comprise a plurality of receiving portions 1064 at different heights such that by choosing the appropriate receiving portion 1064 the desired height can be selected by the user. Alternatively, the system may comprise a set of two or more holding portions 1062 having different height.

The arch-shaped portion 1066 comprises a first end 1067 and a second end 1068. Between the first end 1067 and the second end 1068 the arch-shaped portion 1066 comprises an engaging portion 1069 adapted to engage with the receiving portion 1064. The engaging portion 1069 is preferably adapted to slide through the notch of the receiving portion 1064. The arch-shaped portion 1066 preferably comprises a flexible material in order to stretch a watch strap of a watch being mounted on the arch-shaped portion 1066.

Figure 4:
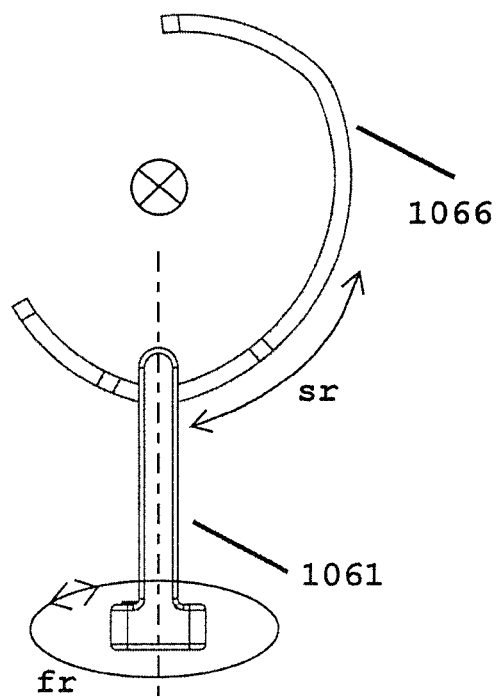
FIG. 4 schematically shows a wristwatch holder according to an embodiment of the present invention.

FIG. 4 is a schematic side view of the wristwatch holder 106 according to an embodiment of the present invention.

As discussed with respect to FIG. 2, by rotating the rotating unit 103 the wristwatch holder 106 can be rotated around a first axis. The first axis is shown in FIG. 4 as a dash-dotted line and the direction of the rotation around a first axis is shown as an oval fr. By moving the engaging portion 1069 through the notch 1064, the arch-shaped portion 1066 can be rotated around a second axis. The second axis is perpendicular to the drawing plane of FIG. 4 and is shown as a $\otimes$-symbol as directing into the drawing plane. The movement around the second axis is shown as a bent arrow sr. The wristwatch is mounted on the arch-shaped portion 1066 such that the watchcase is located between the two ends 1067, 1068 of the arch-shaped portion 1066 without being in contact with the arch-shaped portion 1066. In other words, the watchcase is mounted such that the back of the watchcase is, preferably fully, exposed. Often, the back of the watchcase comprises a glass window in order to have a view to the clockwork inside the watchcase and/or the back of watchcase is richly ornamented. Since the back of the watchcase is fully exposed when mounted on the arch-shaped portion 1066, these peculiarities of the individual watch can be photographed by the camera unit 102.

When a wristwatch is mounted on the arch-shaped portion 1066, a friction force is generated between the engaging portion 1069 of the arch-shaped portion 1066 and the receiving portion 1064 of the holding portion 1061. Due to this friction force, the arch-shaped portion 1066 will stay in its position with respect to the holding portion 1061 without any further fastening means as screws for example. As soon as the wristwatch is unmounted from the arch-shaped portion 1066 the friction force is no longer present and the arch-shaped portion 1066 is rotatable around the second axis again. Of course, a user may also rotate the arch-shaped portion 1066 with the watch being mounted by applying sufficient force. However, it is understood by the skilled person that in addition to the friction force applied, fastening means, as screws, can be used to ensure a fixed position between the arch-shaped portion 1066 and the holding portion 1061 when a watch is mounted on the wristwatch holder 106. The engaging portion, for this purpose, may also comprise several protrusions which may allow for a temporary locking of the arch-shaped portion.

While the invention has been illustrated and described in detail in the drawings and foregoing description, such illustration and description are to be considered illustrative or exemplary and non-restrictive; the invention is thus not limited to the disclosed embodiments. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality and may mean "at least one".

The invention claimed is:

1. Photography system comprising:
   a rotating unit configured to rotate around a first axis,
   an illumination unit,
   a wristwatch holder, the wristwatch holder being mounted on the rotating unit,
   a camera unit, and
   a control unit,
   wherein the control unit is configured to control the camera unit and the rotating unit such that a series of pictures of a wristwatch mounted on the wristwatch holder can be generated automatically, the pictures of the series of pictures showing the wristwatch in different angles with respect to the camera unit, and wherein the wristwatch holder comprises an arch-shaped portion adapted for mounting a wristwatch such that a backside of a watchcase of the wristwatch is exposed further comprising a chamber, wherein an interior of the chamber comprises the wristwatch holder; wherein the illumination unit comprises at least one light dispersive element, wherein the at least one light dispersive element is attached to one or more inner sidewalls of the chamber, to the inner top surface of the chamber and/or to the inner bottom surface of the chamber.

2. Photography system according to claim 1, wherein the wristwatch holder comprises a holding portion and wherein the arch-shaped portion is rotatably mounted on the holding portion such that the arch-shaped portion can be rotated around a second axis being perpendicular to the first axis.

3. Photography system according to claim 1, wherein the arch-shaped portion comprises a flexible material in order to stretch a watch strap of a watch being mounted on the arch-shaped portion.

4. Photography system according to claim 1, wherein a sidewall of the chamber comprises a through-hole and wherein the photography system further comprises a tube having a distal end and a proximal end, the distal end being attached to said through-hole.

5. Photography system according to claim 4, wherein the tube has a conical or cylindrical or bent shape.

6. Photography system according to claim 4, wherein the tube is located between the chamber and the camera unit such that the camera unit is configured to take the series of pictures of the wristwatch mounted on the wristwatch holder through the tube.

7. Photography system comprising: —a rotating unit configured to rotate around a first axis, —an illumination unit, —a wristwatch holder, the wristwatch holder being mounted on the rotating unit, —a camera unit, and —a control unit, wherein the control unit is configured to control the camera unit and the rotating unit such that a series of pictures of a wristwatch mounted on the wristwatch holder can be generated automatically, the pictures of the series of pictures showing the wristwatch in different angles with respect to the camera un it, and wherein the wristwatch holder comprises an arch-shaped portion adapted for mounting a wristwatch such that a backside of a watchcase of the wristwatch is exposed; further comprising a chamber, wherein an interior of the chamber comprises the wristwatch holder; wherein the illumination unit comprises at least one light dispersive element, wherein the at least one light dispersive element is forming at least one part of one or more sidewalls of the chamber, of the top of the chamber and/or of the bottom of the chamber.

8. Photography system comprising: —a rotating unit configured to rotate around a first axis, —an illumination unit, —a wristwatch holder, the wristwatch holder being mounted on the rotating unit, —a camera unit, and - a control unit, wherein the control unit is configured to control the camera unit and the rotating unit such that a series of pictures of a wristwatch mounted on the wristwatch holder can be generated automatically, the pictures of the series of pictures showing the wristwatch in different angles with respect to the camera unit, and wherein the wristwatch holder comprises an arch-shaped portion adapted for mounting a wristwatch such that a backside of a watchcase of the wristwatch is exposed; further comprising a chamber, wherein an interior of the chamber comprises the wristwatch holder; wherein the illumination unit comprises at least one illumination element comprising at least one light source, wherein the at least one illumination element is attached to one or more inner sidewalls of the chamber, to the inner top surface of the chamber and/or to the inner bottom surface of the chamber.

9. Photography system according to claim 8, wherein the at least one light source is dimmable.

10. Photography system according to claim 9, wherein the at least one illumination element comprises an array of 9 clusters of light sources.

11. Method according to claim 10, wherein the array of 9 clusters is ire a 3×3 arrangement.

12. Photography system according to claim 8, wherein the at least one illumination element comprises an array of light sources or an array of clusters of light sources.

13. Method for generating a multi-view picture of a wristwatch comprising the following steps:
providing a photography system comprising a wristwatch holder being mounted on a rotating unit and a camera unit, wherein the wristwatch holder comprises an arch-shaped portion adapted for mounting a wristwatch such that a backside of a watchcase of the wristwatch is exposed,
mounting a wristwatch on the wristwatch holder,
rotating the rotating unit around a first axis,
generating a series of pictures of the wristwatch mounted on the wristwatch holder by means of the camera unit, wherein the pictures of the series of pictures show the wristwatch at different angles with respect to the camera unit, and
merging the pictures to a multi-view picture and/or movie of the wristwatch further comprising the step of setting at least one parameter of an illumination unit of the photography system based on at least one of the following: model of the wristwatch, color of the wristwatch, shape of the wristwatch, size of the wristwatch, user preference; further comprising a chamber, wherein an interior of the chamber comprises the wristwatch holder; wherein the illumination unit comprises at least one light dispersive element, wherein the at least one light dispersive element is attached to one or more inner sidewalls of the chamber, to the inner top surface of the chamber and/or to the inner bottom surface of the chamber.

14. Method according to claim 13, further comprising a step of checking the correct placement of the wristwatch on the wristwatch holder using a viewfinder displayed on a display unit of the photography system.

15. Method according to claim 13, further comprising a step of uploading the series of pictures and/or the merged picture to at least one server in a wide-area-network.

16. Method according to claim 15, wherein the wide-area-network is the Internet.

17. Method according to claim 13, further comprising a step of concatenating meta information of the watch with the merged picture of the watch.

18. Method according to claim 17, further comprising uploading the meta information and the merged picture to at least one server in a wide-area-network.

19. Method according to claim 13, wherein at least one parameter of an illumination unit is determined using at least one of the following: a light sensor, a brightness meter, the camera unit, a second camera unit.

20. Method according to claim 13, wherein the photography system is the system of claim 1.

* * * * *